FIG.2

Dec. 15, 1959     R. H. CAINE ET AL     2,916,982
MACHINE FOR EXPOSING PHOTOSENSITIVE MATERIAL
THROUGH PHOTOGRAPHIC TRANSPARENCIES
Filed March 14, 1956     10 Sheets-Sheet 3

Inventors:
Rolland H. Caine
Gilbert S. Krohn
By: Schroder, Hofgren,
Brady & Wegner
Attorneys

Inventors:
Rolland H. Caine
Gilbert S. Krohn
By: Schroder, Hofgren,
Brady & Wegner
Attorneys

United States Patent Office 2,916,982
Patented Dec. 15, 1959

2,916,982

MACHINE FOR EXPOSING PHOTOSENSITIVE MATERIAL THROUGH PHOTOGRAPHIC TRANSPARENCIES

Rolland H. Caine, Park Ridge, and Gilbert S. Krohn, Chicago, Ill., assignors to R. R. Donnelley & Sons Company, a corporation of Delaware Application March 14, 1956, Serial No. 571,542

14 Claims. (Cl. 95—76)

This invention relates to a machine for exposing photosensitive material, such a bichromated gelatin resists, through photographic transparencies; and in particular it relates to such a machine which is adapted to operations performed at fixed work stations.

Bichromated gelatin resists are exposed through a photographic transparency for use in making rotogravure cylinders. The exposure causes the gelatin to harden differently in different areas, and this controls the rate of diffusion of etchant and depth of etching in different areas of a cylinder.

The principal objects of the present invention are: (1) to provide a machine which permits rapid preparation of photosensitive material; (2) to provide a machine which gives generally even exposure over the entire surface of a single piece of material and over all the pieces in the machine; and (3) to provide a machine which may be operated from fixed work stations so that it can be run by one man if desired. The invention will be described as it is used in preparing bichromated gelatin resists; although it may be used for preparing other photosensitive materials.

As a means of achieving some of the principal objects of the invention, the present machine includes a turret of hexagonal cross section which has a printing frame on each face. Thus, while one or more frames each is in use for exposing resists, the operator may make other frames ready for exposure.

To provide relatively even illumination over the entire area of each of the six printing frames, a group of four mercury arc lamps is disposed about the axis of the turret with the arcuate median plane of the six printing frames bisecting the arc length of the lamps. To even out variations in intensity of illumination of the four lamps, they are mounted upon a slow speed turntable.

To achieve easy one-man operation, the turret is rotatable and the turret drive may be operated at the will of the operator either to advance the turret the distance from one printing frame to the next or to rotate as long as the operator keeps his finger on the turret drive control button. The turret drive is reversible, and rotation in one direction is step by step while rotation in the opposite direction is continuous.

To permit material in any one printing frame to be exposed independently of material in any other printing frame, each frame is at the outside of a printing compartment which is separated from the adjacent compartments by radial partitions; and exposure of the gelatin resist is accomplished by means of a curtain-type shutter which moves across a rectangular frame at the inside of the printing compartment, the shutter having an opening which is as large as the rectangular frame.

To control the exposure of a resist each shutter is driven by an electric motor and the motor control includes timer means which may be set to stop the shutter for a predetermined time with the shutter opening in register with the printing compartment frame. Once the timer means has been set and the curtain motor started the exposure of any given printing compartment proceeds automatically so that the operator can empty and reload other printing frames, and start to expose the resists in them, without paying any further attention to a compartment which is in process.

The invention is illustrated in a preferred embodiment in the accompanying drawings, in which.

Figure 1:
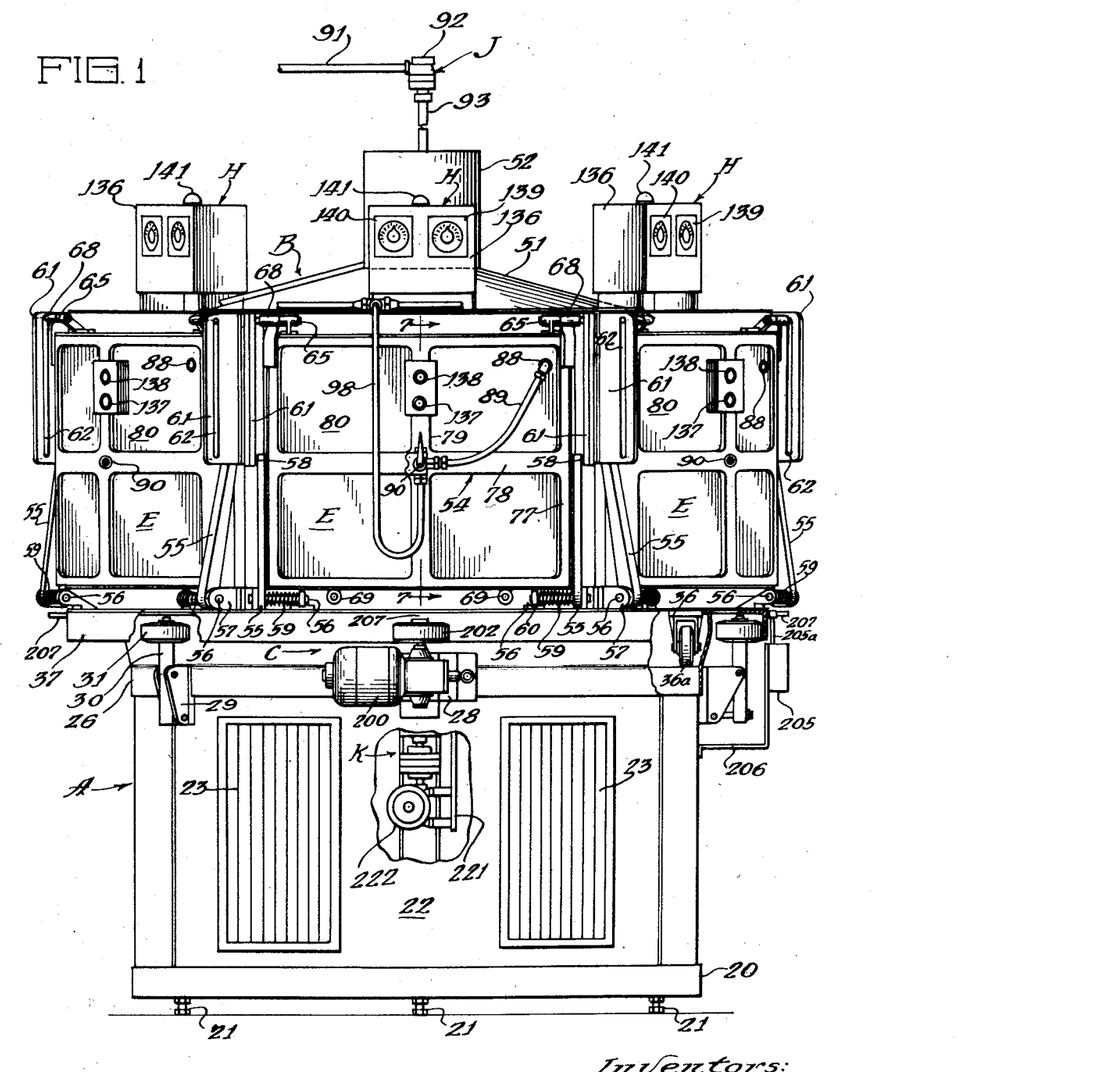
Fig. 1 is a side elevational view of a machine embodying the invention with parts broken away and parts shown in section.
Figure 2:
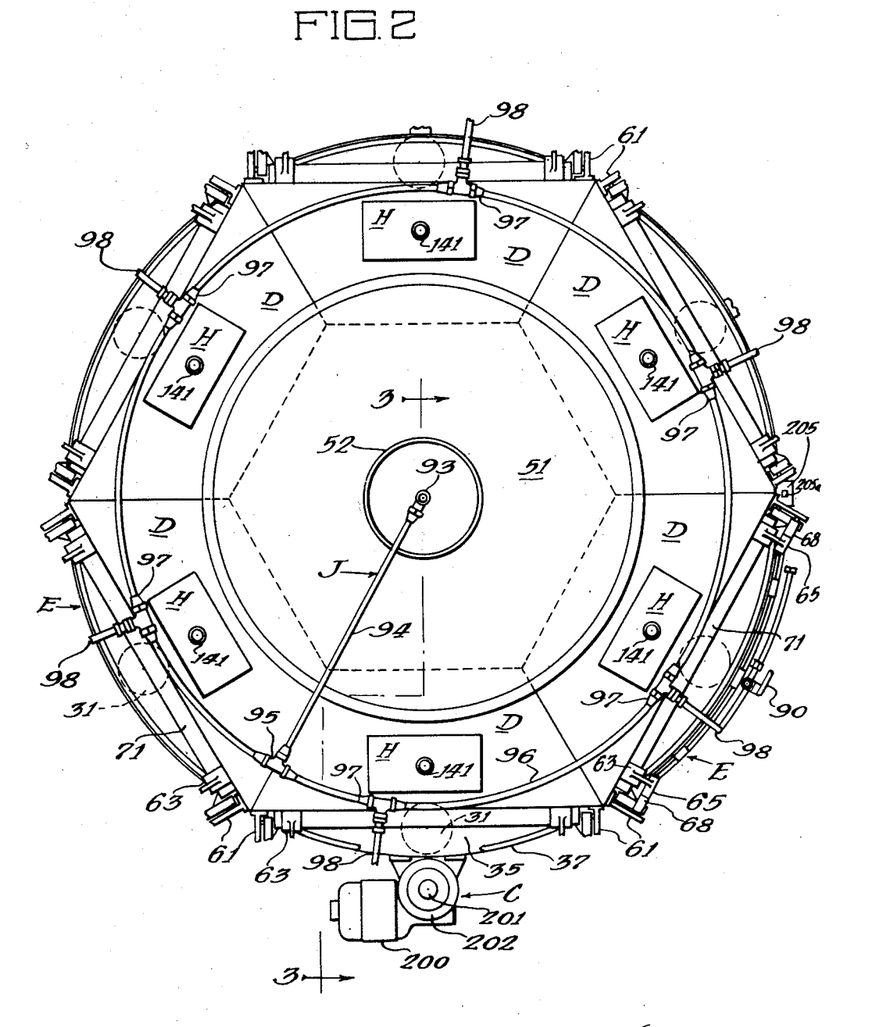
Fig. 2 is a plan view of the machine.
Figure 3:
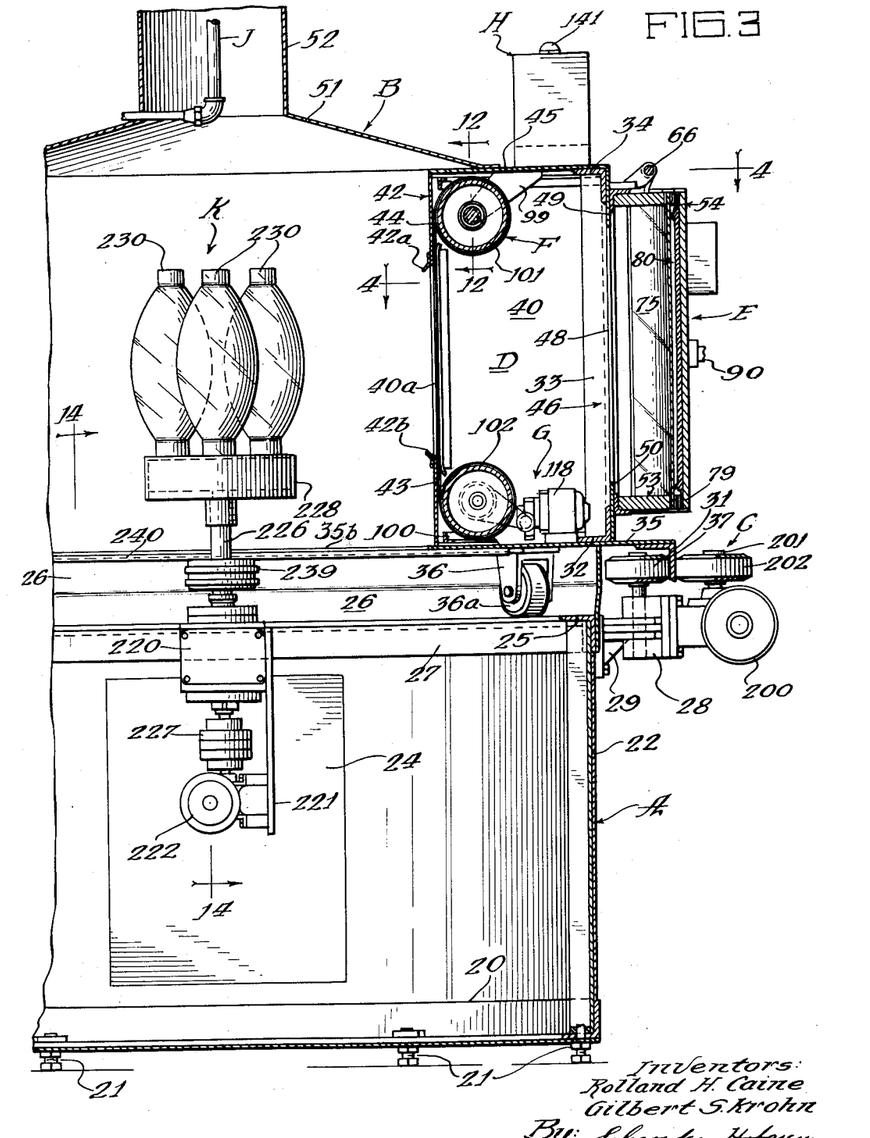
Fig. 3 is a fragmentary section taken as indicated along the line 3—3 of Fig. 2, showing especially the lamp assembly and a printing compartment, with the printing frame and shutter mechanism.
Figure 15:
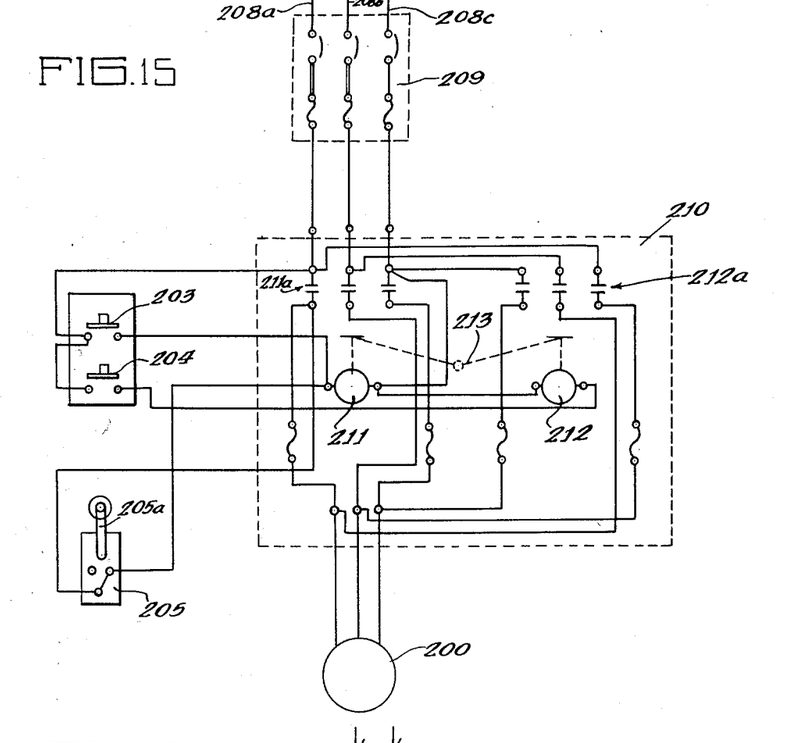
Fig. 15 is a wiring diagram for the turret drive and control.

Referring to the drawings generally, and referring first to Figs. 1 to 3, the machine of the present invention includes a base A and a hexagonal turret B which is rotatably mounted on the base and may be turned at the will of an operator by means of a turret drive and drive control mechanism C, the electrical circuit for which is shown in Fig. 15.

Figure 16:
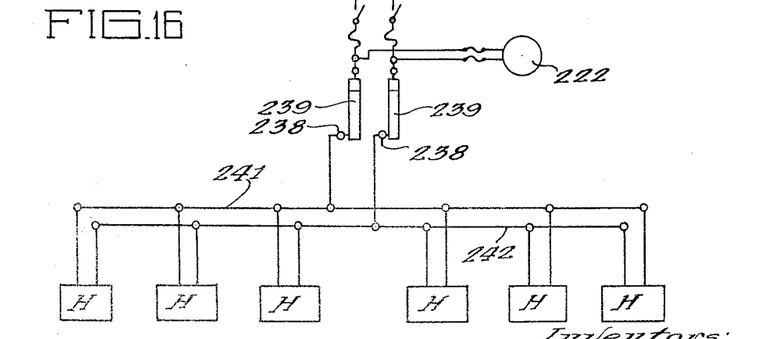
Fig. 16 is a general wiring diagram of the controls for the six shutter drives.
Figure 17:
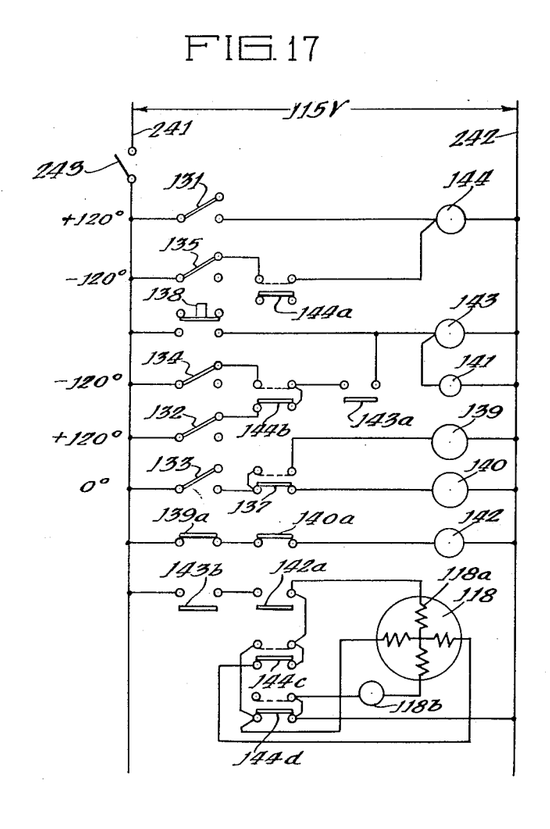
Fig. 17 is a wiring diagram of one of the shutter drive controls of Fig. 16.
Figure 17A:
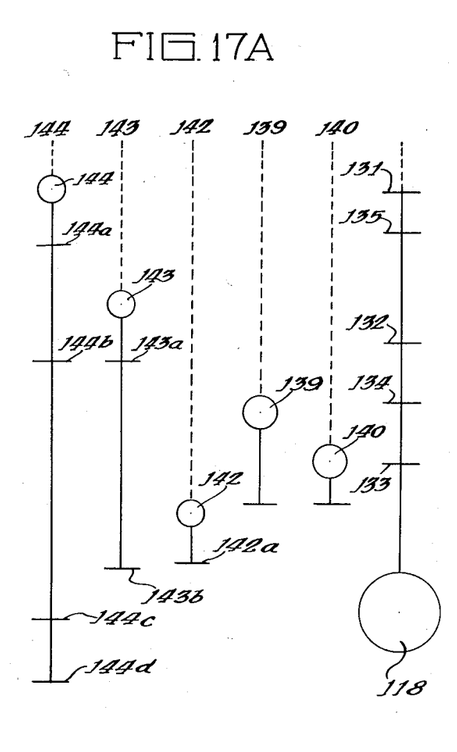
Fig. 17a is a key diagram of the components of Fig. 17.

Extending around the turret B are six printing compartments D each of which is provided with a printing frame E, a shutter assembly F and a shutter drive mechanism G which is controlled by a mechanism H. The electrical circuit for the shutter drive control is shown in Figs. 16, 17 and 17a. Each printing frame E includes a vacuum sheet positioning member which is served by a vacuum system J. In the open interior of the turret B, and supported on the base A, is an illuminating lamp assembly K.

Referring to the drawings in greater detail, and as best seen in Figs. 1 and 3, the base A includes a frame indicated generally at 20 which is supported on adjustable legs 21 for leveling the entire mechanism. The base is surrounded by a metal shell 22 which may be provided with louvered ventilating openings 23 and an access port 24. Extending circumferentially around the top of the base A is an annular angle member 25 which provides a track on which the turret B rotates; and extending upwardly from the outer margin of the angle member 25 is a light shield 26. Extending generally centrally across the base A is a pair of spaced parallel angle members 27 (see Fig. 14) which serve as a support for the illuminating lamp assembly K. Externally mounted on the base A is a bracket 28 for the motor of the turret drive mechanism C. Spaced about the base A are yokes 29 provided with upright spindles 30 for horizontal turret guide casters 31.

Supported on the base A is the turret B which has a polygonal base frame 32 of angle members, a pair of upright frame members 33 at each angle of the polygon, and a polygonal top frame 34 formed of angle members. A centrally open base plate 35 secured to the underside of the base frame member 32 has a circular outer margin 35a and a hexagonal inner margin 35b. Mounted on the underside of the base plate 35 are caster yokes 36 provided with casters 36a which ride on the annular supporting rail 25 of the base A; and on the circular outer margin of the annular plate 35 is a continuous guide rail 37 which encircles the horizontal turret guide casters 31 on the base.

Figure 4:
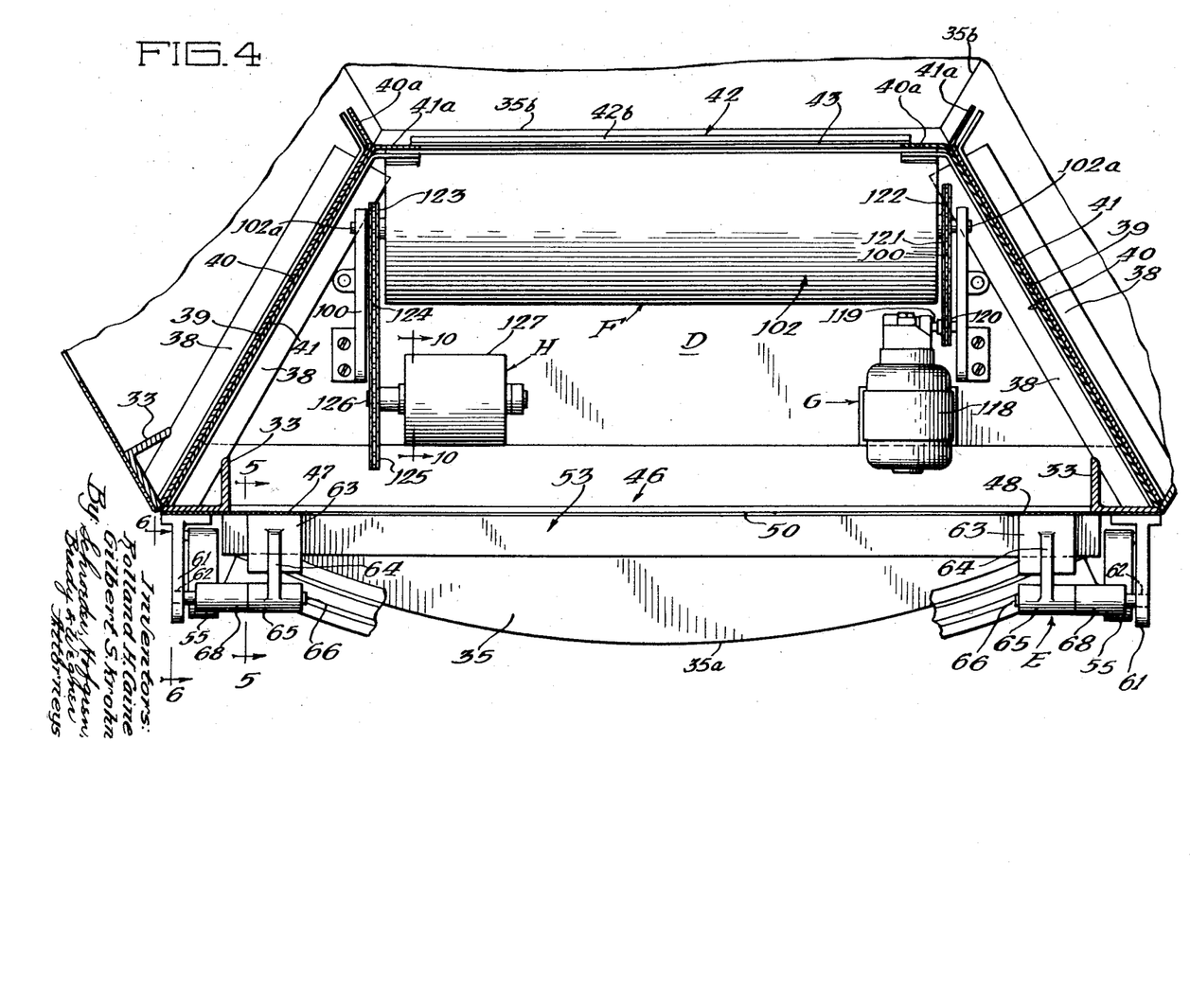
Fig. 4 is a fragmentary section on an enlarged scale taken as indicated along the line 4—4 of Fig. 3, with parts broken away for clarity, showing one printing compartment.

As best seen in Fig. 4, the turret also has a pair of radial angle members 38 which extend from each angle of the hexagon toward the axis of the turret, and between the angle members 38 are partitions 39 each of which is composed of two face-abutting upright plates 40 and 41 the inner marginal portion 40a and 41a of which are turned parallel to the outer faces of the polygon to provide the upright margins of rectangular frames 42. Each rectangular frame 42 also includes a transverse lower frame plate 43 and a transverse upper frame plate 44. As best seen in Fig. 3, extending outwardly from each upper plate 44 of the rectangular frame 42 is a top closure plate 45 the outer margin of which is secured to the adjoining portion of the hexagonal frame 34. The sides of the turret are formed by outer turret frames 46, each of which consists of upright turret frame side plates 47 and 48, together with transverse turret frame top and bottom plates 49 and 50. Each portion of the turret bounded by two partitions 39, the turret base plate 35, a rectangular frame 42, the top closure 45 and an outer turret frame 46 constitutes an exposure compartment D.

The central portion of the turret is provided with a sheet metal hood 51 having a central vent stack 52. The turret may be cooled and ventilated solely by convection, as shown; or a forced draft blower may be mounted in the base or the stack if desired. In an air conditioned plant the turret may be cooled by connecting one of the louvers 23 in the base A to an air conditioning duct and connecting the vent stack 52 to the air conditioning return duct.

Each printing frame E is best seen in Figs. 3 to 7 to consist of a rectangular window frame indicated generally at 53 and a work positioning assembly indicated generally at 54 which is hingedly connected to the window frame 53 as will be described. The window frame 53 is swingably supported on the turret by arms 55 which are connected by pivots 56 to brackets 57 on the turret, the window frames 53 in turn being pivoted on the swinging arms 55 by means of pins 58. As best seen in Fig. 1, each pin 56 is provided with a torsion spring 59 retained between the arm 55 and a spring bracket 60 which urges the arm 55 toward its upright, closed position.

Figures 5, 6, 7:
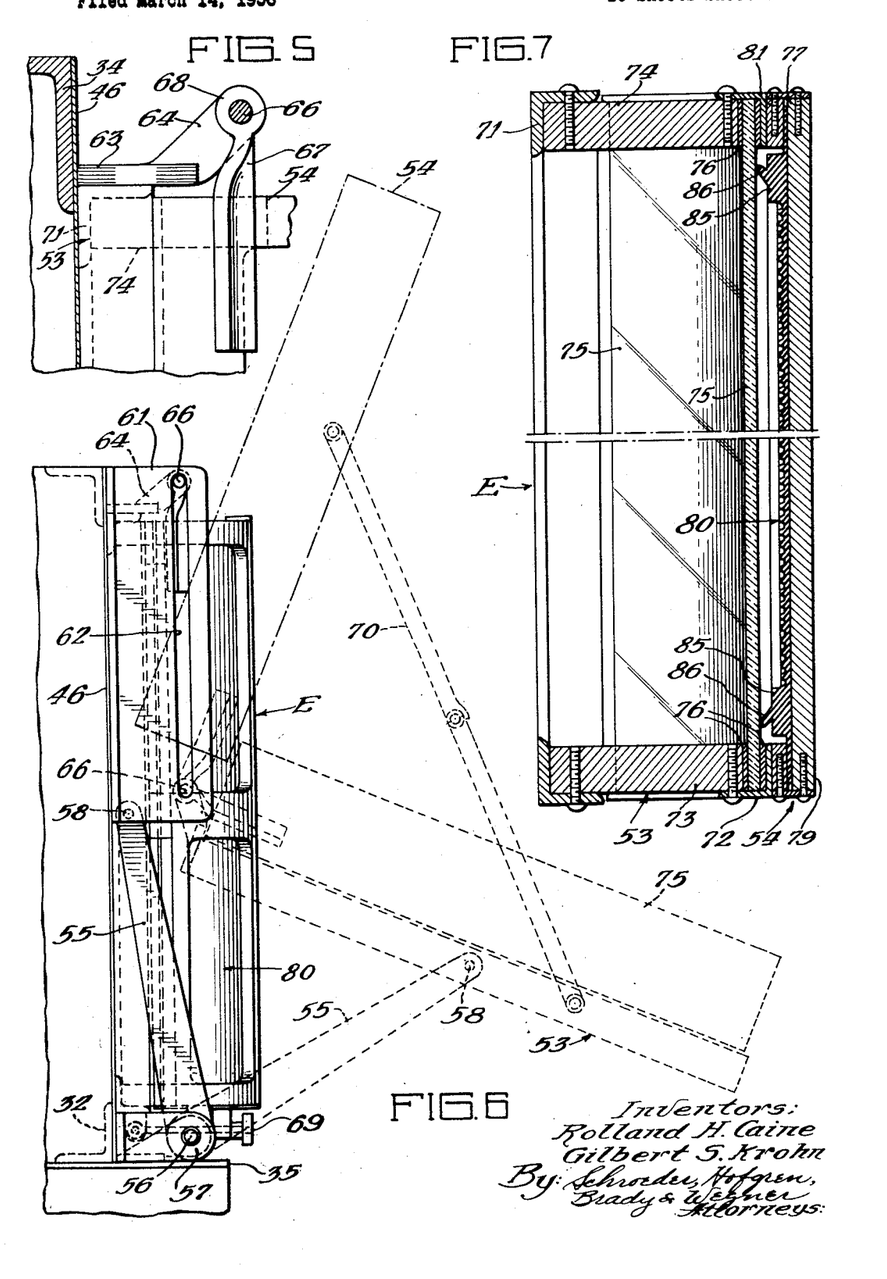
Fig. 5 is a fragmentary section on an enlarged scale taken as indicated along the line 5—5 of Fig. 4.
Fig. 6 is a fragmentary section on an enlarged scale taken as indicated along the line 6—6 of Fig. 4, showing the mounting of a printing frame.
Fig. 7 is a section on an enlarged scale taken as indicated along the line 7—7 of Fig. 1, showing a printing frame.

A pair of guide brackets 61 flanks each window frame 53 and is provided with a vertical guide slot 62. As best seen in Figs. 4 and 5, mounted on top of each window frame 53 is a pair of mounting brackets 63 having integral outwardly extending arms 64 provided at their outer ends with hollow bosses 65 which serve as trunnions for hinge pins 66 which are seen in Figs. 4 and 6 to extend laterally into engagement with the guide slots 62 of the upright guide brackets 61. The resist supporting and positioning assembly 54 is provided with upwardly extending mounting arms 67 provided with hollow bosses 68 by means of which the assemblies 54 are hingedly supported on the hinge pins 66. Thus, as seen in Fig. 6, if the bottom of the window frame 53 is pulled out it swings the mounting arms 55 downwardly and outwardly on their pivots 56, the lower end of window frame 53 is swung out and slightly up, while the upper end of the window frame moves straight down guided by engagement of the pins 66 with the guide slots 62. This leaves the resist positioning assembly 54 on top of frame 53. When the window frame 53 has reached the broken line position of Fig. 6 a pair of screw clamps 69 which clamp the bottom of the positioning assembly 54 to the window frame 53 may be loosened and swung clear so as to permit the positioning assembly 54 to be turned up to the broken line position of Fig. 5. Conveniently, a folding trunk lid brace 70 is pivoted to the window frame 53 and the resist positioning assembly 54 so as to hold the assembly 54 in the open broken line position of Fig. 6.

Referring now especially to Fig. 7, it is seen that the window frame 53 is composed of a rectangular inner frame 71 and a rectangular outer frame 72 between which are a bottom frame member 73 and a top frame member 74. The bottom and top frame members 73 and 74, as well as the outer rectangular frame 72 are transversely curved so as to receive and firmly support a curved plate glass window 75 which is a segment of a cylinder the center of which is on the axis of the turret B. The curved plate glass window 75 is clamped between the bottom and top frame members 73 and 74 and the front frame 72 and is protected and sealed air-tight all around by means of rubber packing strips 76. Thus, when the printing frame is open as shown in the broken line position of Fig. 6 the curved glass window 75 is uppermost so that when the positioning assembly 54 is opened a transparency and bichromate resist may be laid directly upon the glass and temporarily secured thereto with masking tape.

Figure 8:
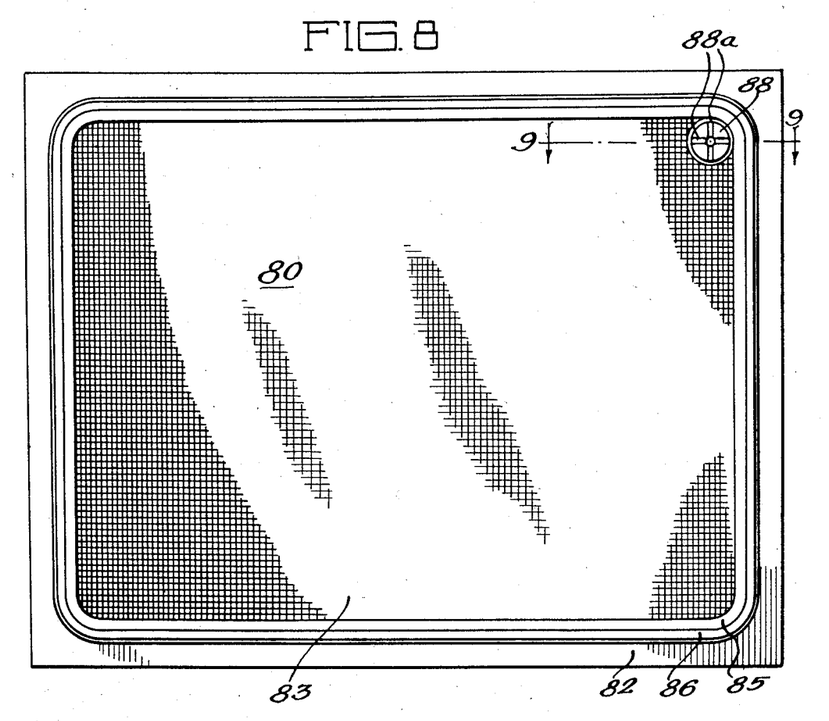
Fig. 8 is a plan view of the rubber blanket for a printing frame, viewing Fig. 7 from the left.
Figure 9:
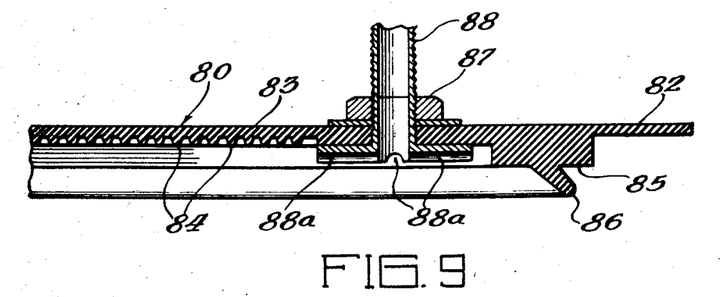
Fig. 9 is a fragmentary section on an enlarged scale taken as indicated along the line 9—9 of Fig. 8.

As best seen in Figs. 1, 7, 8 and 9, the positioning assembly 54 has a rigid frame 77 which is arcuate in horizontal cross section and rectangular when viewed in front elevation. It has a horizontal cross frame member 78 and a vertical cross frame member 79, through which the section Fig. 7 is cut. A rubber vacuum blanket 80, seen in Figs. 8 and 9, is marginally secured to the frame 77 by means of a clamping frame 81 which is complementary to the rectangular frame 77.

As best seen in Figs. 8 and 9, the rubber vacuum blanket 80 has a marginal attaching portion 82 by means of which it is clamped to the frame 77, and a rectangular central body 83 which is molded so as to have a regular pattern of frusto-pyramidal protuberances 84 covering its entire surface, so that it has a surface like a waffle iron. A molded boss 85 surrounds the entire margin of the blanket 80 and is provided with a continuous inclined sealing rib 86 which, as seen in Fig. 7, presses firmly against the curved plate glass window 75 so as to hermetically seal the entire central area between the body 83 of the rubber blanket and the glass. As seen in Fig. 9, the blanket 80 is provided with a standard valve insert assembly 87 having a threaded nipple 88 to receive a flexible air hose 89 (see Fig. 1). The flexible air hose 89 is connected into the vacuum system J through a manual control valve 90 which is mounted on the center of the frame 77 where it is readily accessible to an operator running the mechanism. The waffle pattern on the face of the vacuum blanket 80 permits the air to flow freely to the vacuum line from all parts of the space and a pair of cross slots 88a in the inner face of the valve nipple 88 provides free access of air from the space into the vacuum line.

As best seen in Figs. 1 and 2, the vacuum system J consists of a central air supply pipe 91 which is provided with a rotary joint 92 from which a vertical lead-in pipe 93 extends axially downwardly through the vent stack 52. A radial air supply pipe 94 has a T-joint 95 at its outer end from which a continuous circular supply pipe 96 extends entirely around the top of the turret. At each face of the turret a T-joint 97 in the supply pipe 96 provides a connection for a rubber air hose 98 the other end of which is connected to the manual valve 90.

Thus, in the use of the mechanism, when a printing frame E which is in open, broken line position of Fig. 6 has been loaded with one or more transparencies and bichromate resists the trunk lid brace 70 may be collapsed to close the resist positioning frame assembly 54 which is clamped down by the screw clamp 69 to bring the marginal sealing flange 86 of the rubber blanket 80 into firm engagement with the curved glass window 75. The operator then opens the vacuum line valve 90 to evacuate the space between the window and the blanket which redraws the blanket firmly against the window and assures firm, perfect contact of the transparencies and the resists over their entire surfaces.

Printing frame E may then be returned to the vertical, printing position shown in Fig. 6 in solid lines, and the operator may proceed to set the shutter motor control H and start the shutter drive G.

Figure 12:
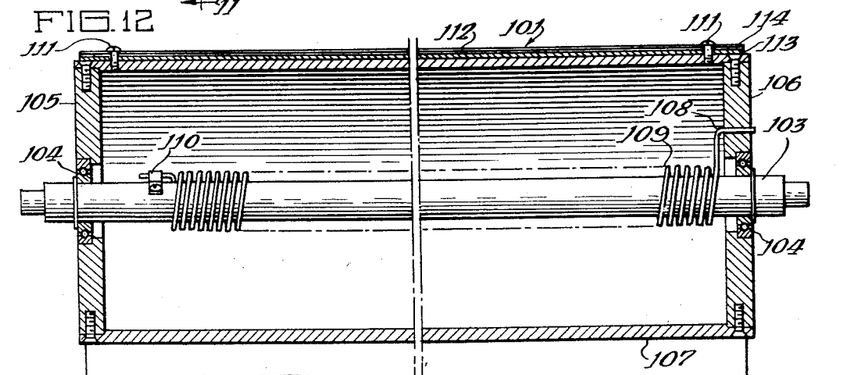
Fig. 12 is a fragmentary section on an enlarged scale taken as indicated along the line 12—12 of Fig. 3, showing a spring loaded shutter roller.

The shutter assembly F is best shown in Figs. 3, 4, 12 and 13. As best seen in Figs. 3 and 4, each printing compartment D is provided with a pair of upper shutter roller brackets 99 and lower shutter roller brackets 100 in which are respectively mounted an upper shutter roller 101 and a lower shutter roller 102. The upper shutter roller 101 is seen in section in Fig. 12, and the construction of the two rollers is generally similar except for the fact that the roller 101 is spring loaded while the roller 102 is motor driven as will be described. As seen in Fig. 12, the roller 101 has a central spindle 103 provided at its ends with lightweight bearing assemblies 104 to rotatably receive head plates 105 and 106 on which is mounted a roller cylinder 107. The roller head plate 106 is provided with a spring retaining opening to receive one end 108 of a torsion spring 109 which is wound around the spindle 103 and has its other end secured to a bracket 110 on the spindle. The cylinder 107 is tapped adjacent its two ends to receive screws 111 by means of which one end of a curtain-type shutter 112 is secured to the roller 101. The lower end of shutter 112 is secured to the power driven roller 102 in the same way that its upper end is secured to the spring loaded roller 101. The only significant difference between the rollers 101 and 102 is that the latter is not provided with the torsion spring 109.

The spindle for the upper roller 101 is mounted in the upper roller brackets 99, while the lower roller 102 is provided with a spindle 102a by means of which it is mounted in the lower roller brackets 100.

Figure 13:
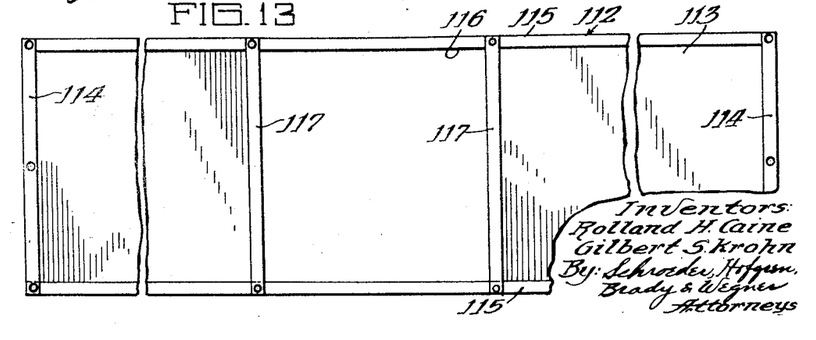
Fig. 13 is a broken plan view of the shutter curtain.

As best seen in Fig. 13, a curtain-type shutter 112 consists of an elongated rectangular piece of fabric 113 which is provided at both ends with thin spring steel reinforcing and mounting strips 114 to receive the mounting screws 111. Likewise, thin spring steel side strips 115 extend from end to end of the fabric curtain body 113. Midway between the ends of the curtain-type shutter 112 is a rectangular exposure opening 116 which is bordered at its longitudinal margins by the spring steel strips 115 and at its top and bottom margins by spring steel strips 117. The rectangular exposure opening 116 is of substantially identical dimensions with the opening in the rectangular exposure frame 42 which forms the inner margin of the printing compartment D.

Ventilation of the interior of the turret has previously been mentioned. When a printing frame E is opened a draft through the printing compartment D may belly the curtain 112 into the opening of the exposure frame 42; and to prevent curtain damage under such conditions the top and bottom margins of the opening are provided with inclined lips shown as 42a and 42b, respectively.

Figures 10, 11:
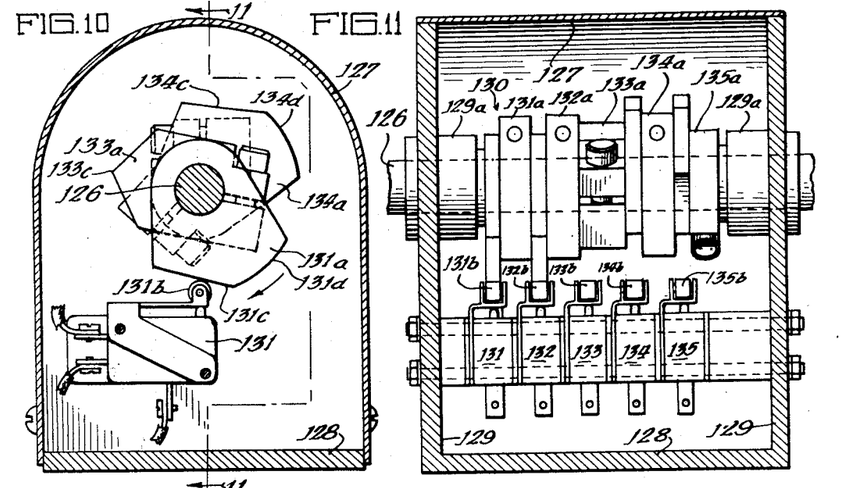
Fig. 10 is a section on an enlarged scale taken as indicated along the line 10—10 of Fig. 4 showing a cam and microswitch assembly which is part of the shutter drive control.
Fig. 11 is a fragmentary section taken as indicated along the line 11—11 of Fig. 10.

As seen at the right-hand end of Fig. 4, the shutter drive G consists of a worm gear reduction reversible synchronous electric motor 118 which is mounted on a motor base on the bottom plate 35 of the turret. The shaft 119 of motor 118 is provided with a pulley 120 from which a chain 121 is trained over a pulley 122 at the right-hand end of curtain roller 102 so that operation of the electric motor may drive the curtain roller 102 and wind curtain-type shutter 112 onto the lower roller 102 against the tension of the torsion spring 109 in the upper roller 101. The operation of the shutter mechanism is such that the shutter may move opposite ways on successive exposures, so that on one exposure the motor 118 acts to draw the curtain-type shutter 112 off of the spring loaded roller 101, while on the next succeeding exposure the motor merely acts as a brake while the energy stored up in the torsion spring 109 rewinds the curtain-type shutter onto the roller 101 at a rate of speed controlled by the speed of the synchronous motor 118. The shutter drive G also includes a pulley 123 at the left-hand end of driven shutter roller 102 on which is trained a belt 124 to drive a pulley 125 on a cam shaft 126 which, as best seen in Figs. 10 and 11, extends through a housing 127. As best seen in Fig. 11, the housing 127 includes a base 128 and end plates 129 which are provided with bosses 129a which serve as bearings for the spindle 126; and inside the housing is a control cam and switch mechanism, indicated generally at 130, which is part of shutter drive control H. On the shaft 126 are keyed or clamped five shutter control cams indicated as 131a, 132a, 133a, 134a and 135a which control, respectively, the operation of microswitches 131, 132, 133, 134 and 135, each of which is provided with a spring switch arm which are indicated as 131b to 135b, respectively.

The cams and microswitches control the operation of the shutter drive mechanism G through electrical control mechanism for each individual printing compartment which is contained in a control box 136 mounted on top of the turret B where it can be reached by an operator handling the machine. The controls H are generally under the control of the operator through the medium of a so-called "flash"-"time" selector switch 137 and a "start" button 138. Due to the extreme slowness of the bichromated gelatin film used in the resist, the terms "flash" and "time" are merely relative; inasmuch as the flash exposure may be any time up to two minutes and the time exposure any time from two minutes to an hour. Since no one timer can cover this entire range accurately, the control box 136 is provided with two separate timers, a "flash" exposure timer 139 and a "time" exposure timer 140. The timer to be used is chosen by operation of the selector switch 137. The flash timer 139 and the time control timer 140 are parts of two parallel and alternative control circuits both of which operate in conjunction with the cam control and microswitch assembly 130 to control the operation of the shutter drive.

The control circuits and cam controls are so arranged that pressing start button 138 initiates a sequence of operations which starts the shutter drive motor 118 either to draw the shutter down or permit it to move up at a controlled speed, as the case may be, and continues the motor operation until the shutter opening 116 is in register with the opening in the rectangular exposure frame 42.

At this point a timer starts, and as long as the timer is running the shutter is stationary.

The diameter of the two curtain rollers 101 and 102 is so related to the distance between them that two revolutions of the rollers are required to move the curtain the full distance from one roller onto the other. The cam shaft 126 is driven at ⅓ the speed of the shutter drive rollers, so that it rotates 240°, or ⅔ of a revolution, for each shutter operation. Switches 131 and 135 are shutter motor reversing switches, 132 and 134 are shutter motor stop switches, while 133 is a timer "start" switch. If we consider the point of switch actuating lobe 133c of the cam 133a as the zero point in the travel of the cam shaft, then the point at which switches 131 and 132 are fully actuated by the cams 131a and 132a would be plus 120°; and the position at which the switches 134 and 135 are fully actuated is minus 120°.

In Fig. 10 the cam 131a has its actuating lobe 131c in the process of actuating switch 131, and 132a is substantially in line with 131a. The mechanism is just finishing rolling curtain 112 onto spring roller 101, and the cam shaft 126 is turning as shown by the arrow in Fig. 10 to bring the cams to the plus 120° point at which "dwells" 131d and 132d roll onto arms 131b and 132b to shut off the motor and reverse it. When this has taken place and the printing frame is reloaded and the desired timer is reset the operator uses timer selector switch 137 to place the desired timer in circuit and then presses start button 138 to start the shutter operation; and the cam shaft 126 rotates so as to release the switch arms 131b and 132b. After one revolution of the shutter rollers the cam shaft has rotated 120° to bring the actuating lobe 133c of cam 133a into contact with switch arm 133b which starts the timer and stops the motor with the shutter curtain opening at the midpoint of its travel in register with the rectangular frame 142. When the timer completes its cycle it again closes the circuit to the shutter motor and carries the cam shaft another 120° so as to bring the cams 134a and 135a into contact with the switch arms 134b and 135b. At the minus 120° point switch 134 stops the motor drive, while switch 135 reverses the motor. Next time the push button is depressed to start the curtain drive the sequence is reversed. The cams 131 and 132 are identical with the cams 134 and 135, but mounted oppositely on the cam shaft so that the inclined switch actuating lobes 131c and 132c are opposed to the corresponding lobes 134c and 135c. These inclined lobes depress the switch arms gradually, and when an arm is fully depressed the "dwell" of the cam rides onto the switch arm roller to hold it down until the cam shaft reverses its travel.

The cams 131 and 132 are set slightly out of phase with one another, but too little to show in Fig. 10, as are the cams 134 and 135, so that the motor 118 is first stopped and then reversed at each end of a single operation. If the drive mechanism "coasts" slightly as it stops, the drive and reversal may occur on the same operation; but if it stops immediately the next operation of the starter button will carry the drive forward to the reverse point and then reverse it.

Surmounting each shutter control box 136 is a pilot light 141 which burns whenever the shutter control is in operation. This serves both to prevent the operator from inadvertently opening a frame during exposure and to signal him when he can reload a frame.

Turning now to the shutter control circuit diagram, Figs. 17 and 17a, it will be seen that the circuits are energized from a suitable source of power, as 115 volts A.C. connected to leads 241 and 242. A manually operated power switch 243 permits each control unit to be turn on and off at will.

The contacts associated with the various relays are all shown in the unenergized relay condition and the cam operated switches 131—135 are all shown in the position they take after a reversal of direction at the minus 120° position of the cam shaft 126 as previously described. When the power switch 243 is closed, timer relay 142 is energized through switch contacts 139a and 140a, associated with timers 139 and 140 respectively. Relay 142 in turn closes contact 142a in the circuit of shutter motor 118. The first step in initiating operation of the shutter control is the selection of the desired timer 139 or 140 by manipulation of double throw selector switch 137. The selected timer is then set for the appropriate exposure time interval.

Start switch 138 is next closed momentarily completing the energization circuit for "start" relay 143. When relay 143 is energized contacts 143a and 143b associated therewith are closed. Contact 143a completes a holding circuit through contact 144b and cam switch 132, the relay 143 remaining energized until the end of the exposure cycle, as will appear. Pilot light 141 is connected in parallel with relay 143 and likewise remains energized during the exposure cycle. Contact 143b of relay 143 is connected in the circuit of shutter motor 118 and when this contact closes the shutter motor turns in the forward direction to operate the shutter, as previously described.

After the cam shaft has turned 120°, shutter opening 116 is in registry with the rectangular frame opening and cam switch 133 is closed, energizing timer 140 as shown in the circuit diagram. Immediately upon energization of the timer, contact 140a associated therewith opens, breaking the energization circuit for timer relay 142, permitting contact 142a in the shutter motor circuit to open, stopping the motor. After the timer has run its cycle, and the exposure is completed, contact 140a is again closed and relay 142 energized, closing contact 142a and energizing shutter motor 118, which again turns in the forward direction. At or near the completion of another 120° of rotation of cam shaft 126, the plus 120° position, cam switch 132 is opened, breaking the holding circuit for start relay 143, and contacts 143a and 143b associated therewith open, contact 143a breaking the start relay holding circuit so that switch 132 may close without again energizing relay 143, and contact 143b breaking the shutter motor circuit.

If the parts "coast" after the motor circuit is broken, cam switch 131 is closed, energizing motor reversing relay 144. (If the parts do not "coast," cam switch 131 is closed at the start of the next exposure cycle.) This closes contact 144a and reverses the connection of double throw contacts 144b in the start relay holding circuit, and 144c and 144d, both in the shutter motor circuit. Contacts 144c and 144d reverse the connections of motor winding 118a so that the motor will run in the opposite or reverse direction when again energized. A phase shift capacitor 118b is connected in series with motor winding 118a.

When the shutter control is again energized by closing the start switch 138, a similar control cycle is initiated. The holding circuit for start relay 143 is now completed through cam switch 134 and the motor reversing relay is maintained energized through a holding circuit including contact 144a and cam switch 135; and cam switch 133 again closes at the "zero" position starting the timer to control the exposure interval. At the end of the second cycle of operation, the minus 120° position of cam shaft 126, cam switch 134 is opened breaking the holding circuit for start relay 143. As the parts coast to a stop (or at the start of the next subsequent operation), cam switch 135 is opened, breaking the motor circuit for motor reversing relay 144, permitting the contacts associated therewith to return to position shown in Fig. 17.

The turret drive C is best seen in Figs. 1, 2 and 3, and the control for the turret drive is shown in the wiring diagram, Fig. 15. As previously pointed out, the base A carries a bracket 28 for a turret drive motor 200 which is provided with an upright shaft 201 on which is a rubber tired drive wheel 202. The drive wheel 202 contacts the outer face of the annular guide rail 37 at the base of the turret B directly opposite one of the horizontal turret guide wheels 31, so that rotation of the drive wheel 202 by the motor 200 may rotate the turret. The motor 200 is provided with an internal worm gear arrangement so that its normal drive speed is about 32 r.p.m. In many operations of the mechanism it is desirable to advance the turret one printing frame E at a time, while under other conditions it is desirable to rotate the turret to bring any desired printing frame E in front of the operator. In order to accomplish this, the motor 200 is reversible; and as seen in Fig. 15 the motor operating circuit includes an intermittent drive control button 203 and a continuous drive control button 204. If the button 203 is pressed the turret is driven counterclockwise. A microswitch 205 mounted on a bracket 206 on the base A has a switch arm 205a alongside the annular positioning flange 37 at the bottom of the turret B. Adjacent each station on the turret is a fixed drive control finger 207 which is adapted to contact the switch arm 205a of microswitch 205. When the switch arm 205a is contacted by a control finger 207 as the turret moves counterclockwise it opens the motor circuit for the turret drive motor 200 and stops the turret, and this takes place when the turret has revolved a sufficient distance to move the printing frame which was to the left of the operator's station up to a position directly in front of the operator. As shown in the diagram, Fig. 15, the intermittent drive switch 203 is an instantaneous switch which merely closes a holding circuit.

If the operator wants to bring to his station a printing frame E other than that immediately to his left, he can press the continuous drive button 204 and hold it down so as to drive the motor 200 in the opposite direction and rotate the turret clockwise until the printing frame on which he wishes to work is directly in front of him. For exact positioning of any given printing frame, it is simplest for the operator to keep his finger on the continuous drive button 204 until the control finger 207 for that printing frame has over-ridden the microswitch arm 205a, after which he can release the continuous drive button and press the intermittent drive button so as to bring the desired printing frame back to the precise position at the operator's station.

Referring now to Fig. 15, the turret drive motor 200 is energized from a suitable power source, as a 220 volt three-phase service, connected to leads 208a, 208b and 208c. An overload circuit breaker 209 and a motor reversing unit, indicated generally as 210, are provided.

When intermittent drive button 203 is depressed a circuit is completed between lines 208a and 208c energizing relay 211 and closing contacts 211a associated therewith to energize turret drive motor 200. A holding circuit for relay 211 is completed through switch 205 so that intermittent drive button 203 need be depressed only momentarily. After the turret has turned in a counterclockwise direction to a position where the next frame is properly positioned, switch 205 is opened, as previously described, breaking the holding circuit for relay 211 and stopping turret drive motor 200.

When continuous drive button 204 is depressed, relay 212 is energized closing contacts 212a associated therewith and connecting turret motor 200 for operation in the opposite or clockwise direction. No holding circuit is provided for relay 212 and accordingly button 204 must be depressed for so long as it is wished to rotate the turret in the clockwise direction. Relays 211 and 212 are mechanically interconnected, as indicated by the broken lines 213, to insure that only one set of contacts 211a and 212a are closed at a time.

Figure 14:
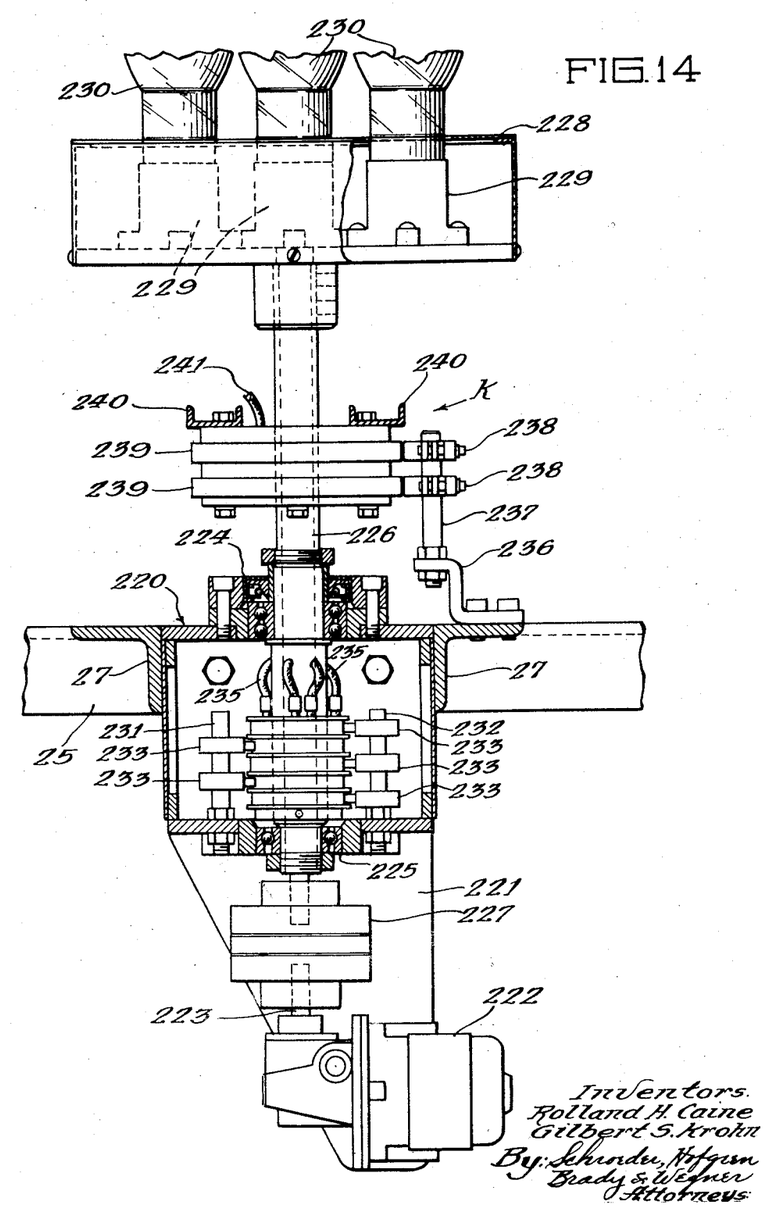
Fig. 14 is a fragmentary section on an enlarged scale taken as indicated along the line 14—14 of Fig. 3, showing the lamp assembly and drive.

Illumination for exposing resists in the printing frames E in the machine is provided by the illuminating lamp assembly K, which is best seen in Figs. 3 and 14. Referring particularly to Fig. 14, it is seen that the illuminating lamp assembly is supported on the parallel cross rails 27 of the base A in a box-like bracket indicated generally at 220. Extending downwardly from the bracket 220 is a motor mounting arm 221 on which is mounted a slow speed internally geared drive motor 222 which has a normal operating speed of about 16½ r.p.m. The motor 222 is mounted with its shaft 223 in a vertical position on the axis of rotation of the turret B. The bracket 220 also furnishes support for an upper ball bearing raceway 224 and a lower ball bearing raceway 225 in which is mounted an illuminating lamp assembly shaft 226 which is connected by a flexible coupling 227 with the shaft 223 of motor 222. Surmounting shaft 226 is a circular base 228 on which are four socket bases 229 for mercury arc lamps 230. The socket bases 229 are circumferentially disposed about the midpoint of the platform 228 so that they are equidistant from the axis of the turret B. Likewise, as seen in Fig. 3, the horizontal median plane of the window frames 53 in the printing frames E substantially bisects the arc length of the lamps so that the surfaces of the transparent plate glass windows 55 are illuminated as evenly as possible. The illuminating lamp assembly drive motor 222 operates at all times when the machine is in use, so that the platform 228 rotates like a turntable at about 16½ r.p.m. so as to eliminate any variation in exposure or intensity of illumination at different printing frames due to differences in candle power of the four mercury arc lamps.

Since the lamps 230 are on a turntable the electric current for operating them must be carried through a collector ring, and such a mechanism is provided in the box-like bracket 220 where upright posts 231 and 232 support brushes 233 which are in contact with a series of five collector rings 234 from which suitable feed wires extend to the lamp bases 229.

Since the shutter drive control H is also on the revolving turret, all of the drive controls must also receive their current from a collector ring, and for this purpose a bracket 236 is provided on one of the cross members 27 of the base A to support an upright armature bracket 237 on which is a pair of brushes 238 which make contact with collector rings 239 mounted on brackets 240 which extend across the bottom of the turret as seen in Fig. 3. Suitable lead wires 241 and 242 connect the collector rings 239 with the several shutter control mechanisms H as shown in the general wiring diagram, Fig. 16.

In use the lamp assembly is in constant operation and is constantly rotated so as to maintain brilliant, even illumination within the turret; and exposure of material in any given printing frame E is controlled solely by the shutter F which is on the exposure frame 42 of the printing compartment D for the given printing frame E. The pilot light 141 on each control box 136 informs the operator when he can open the printing frame E to take out the transparencies and exposed resists and reload the frame.

The foregoing detailed description is given for clearness of understanding only and no unnecessary limitations are to be understood therefrom, as some modifications will be obvious to those skilled in the art.

We claim:

1. In a device of the character described: a base; an upright polygonal turret rotatably mounted on said base; a printing frame on each face of said turret, each of said frames having a transparent window which is a segment of a cylinder the axis of which is the vertical median line of the polygon; means for supporting work in firm contact with each said window; a light source which has its center of illumination substantially at the axis of the cylinder and substantially aligned with the arcuate median lines of the windows so that all windows receive substantially the same intensity of light; means for individually controlling the time which each window is illuminated by the light source means for rotating the turret in one direction for any desired distance; and means for rotating the turret in the opposite direction in separate steps each of which is limited to the angular distance from one printing frame to the next.

2. In a device of the character described: a base; an upright polygonal turret rotatably mounted on said base; a turntable axially mounted in the turret; a plurality of high intensity light elements on said turntable equidistant from the turret axis; means for constantly rotating the turntable; a plurality of upright radial partitions extending from the angles of the polygonal turret toward the platform to divide the turret into a plurality of exposure compartments; an upright rectangular frame defining the inner limit of each compartment; shutter means for each compartment including rollers above and below said frame and a curtain wound on said rollers, said curtain having an opening adapted to register with the frame; shutter drive means including an electric motor to wind the curtain on one roller and spring means to wind the curtain on the other roller; shutter control means to stop the curtain with the opening in register with the frame, said control means including adjustable timer means to selectively vary the time which the curtain stops; a printing frame swingably mounted at the outside of each printing compartment, each frame having a transparent window which is a segment of a cylinder which is coaxial with the turret; link means for swinging each printing frame between an upright exposure position and an outwardly extending loading position with the transparent window down; elastic vacuum activated resilient blanket means for pressing a transparency and a photosensitive sheet firmly against the window, said blanket means including a supporting frame hinged on the printing frame; reversible turret drive means for rotating the turret in either direction at the will of an operator; and turret drive control means operable only on movement of the turret in one direction for automatically stopping rotation of the turret when it has turned the distance from one printing frame to the next adjacent printing frame.

3. In a device of the character described: a base; a regular polygonal shell having vertical faces, said shell being rotatably mounted on the base to index any face to an operator's station; a printing frame on each face of said shell, each of said frames having a solid transparent window, and the vertical median lines of all said windows being equidistant from the vertical median line of the shell; means for supporting work in firm contact with the outside of each window; a turntable within and concentric with said median line of the shell; a high intensity light source on said turntable with its center of illumination substantially on the axis of the turntable and substantially aligned with the horizontal median lines of the windows; means for constantly rotating said turntable to neutralize variations in the intensity of said light source along different radii from the axis; and means for individually controlling the time which each window is illuminated by the light source.

4. The device of claim 3 in which the light source consists of a plurality of illuminating elements which are equidistant from the axis of the turntable.

5. In a device of the character described: a regular polygonal shell having vertical faces; a printing frame on each face of said shell, each of said frames having a solid transparent window, and the vertical median lines of all said windows being equidistant from the vertical median line of the shell; means for supporting work in firm contact with the outside of each window; a high intensity light source which has its center of illumination substantially on said median line of the shell and substantially aligned with the horizontal median lines of said windows so that all windows receive substantially the same intensity of illumination; an exposure frame between each window and the light source; a curtain type shutter mounted on rollers above and below each of said frames, each said shutter having an opening which is substantially the size of the window; reversible shutter drive means operatively connected to the rollers for each shutter for moving said shutter across the window onto either of said rollers; means for operating said drive means to move the shutter in opposite directions on successive exposures and variable shutter drive control means operable on movement of the shutter in either direction for stopping each shutter for a predetermined length of time within a time range, with the shutter opening aligned with the window.

6. The device of claim 5 in which there is a driven roller for each shutter curtain which is rotatable by the shutter drive means in one direction and a spring roller which is spring urged to rotate in the opposite direction, and the shutter drive means includes an electric motor to wind the curtain onto the driven roller against the tension of the spring roller or to act as a brake when the curtain winds onto the spring roller.

7. In a device of the character described: a plurality of juxtaposed vertical printing compartments arranged at equal distances about a central vertical axis, each said compartment having an exposure frame which defines the margins of one face of a polygon and a printing frame the side margins of which are in a plane parallel to that of said exposure frame and more distant from the axis; a solid transparent window in each printing frame; radially extending vertical walls separating adjacent printing compartments; means for supporting work in firm contact with each window; a central light source which has its center of illumination substantially on said central vertical axis and substantially on the horizontal median lines of the windows so as to alluminate all said windows substantially equally; a curtain-type shutter extending from top to bottom of each exposure frame, each said shutter having an opening substantially the size of the printing frame and adapted to register with the exposure frame; reversible shutter drive means for moving the shutter curtain across said exposure frame in either direction; means for operating said drive means to move the shutter in opposite directions on successive exposures; and variable shutter drive control means operable on movement of the shutter in either direction for stopping each shutter with the shutter opening aligned with the window for a predetermined length of time within a time range.

8. In a device of the character described: an upright framework; a substantially rectangular printing frame having a transparent solid window; link means supporting said frame in said framework for movement between a vertical printing position with its margins abutting the framework and a loading position with the window down, the inner margin of the printing frame in said position being in a plane no lower than that of the outer margin; a supporting frame hingedly connected to the top of the printing frame at the outside of the window; an elastic blanket secured to said supporting frame and adapted to be marginally sealed to the outer face of the window; a light source which has its center of illumination substantially aligned with the midpoint of said window; and means for controlling the time which said window is illuminated by said light source.

9. In a device of the character described: a base; an upright polygonal turret rotatably mounted on said base; a printing frame on each face of the turret, each of said frames having a transparent window; releasable supporting means for holding work in firm contact with said window; a light source which has its center of illumination substantially at the axis of the turret and substantially aligned with the horizontal median lines of the windows so that all windows receive substantially the same intensity of light; means for individually controlling the time which each window is illuminated by the light source; a reversible turret drive for rotating the turret at the will of an operator to position a printing frame at a loading station; and turret drive control means which is operative only when the turret is driven in one direction, said control means being adapted to automatically stop rotation of the turret when it has turned the distance from one printing frame to the next adjacent printing frame.

10. In a device of the character described: an upright framework; a light source laterally spaced from said framework; a substantially rectangular printing frame having a transparent solid window; link means supporting said frame in said framework for movement between a vertical printing position with its margins abutting the framework, and a loading position extending laterally away from said light source, the window in printing position having its midpoint substantially aligned with the center of illumination of the light source, and the face of the window remote from the light source being uppermost in loading position; an elastic blanket operatively associated with said window to press work into firm contact with the window; and means for controlling the time which said window is illuminated by said light source.

11. In a device of the character described: an upright polygonal shell; a rectangular printing frame swingably mounted on each face of said shell for movement between a vertical printing position and a loading position; a solid transparent window in each frame which is a segment of a cylinder having its axis on the vertical median line of the polygon when the frame is in printing position, the outer face of said window being uppermost when the frame is in loading position; a supporting frame hingedly connected to the top of each printing frame at the outside of the window; elastic means on each said supporting frame to press work into firm contact with the window; a light source within the shell which is adapted to provide light of substantially the same intensity to all said windows; and means for individually controlling the time which each window is illuminated by the light source.

12. In a device of the character described: an upright polygonal shell; a rectangular printing frame swingably mounted on each face of said shell for movement between a vertical printing position and a loading position; a solid, transparent window in each frame which is a segment of a cylinder having its axis on the vertical median line of the polygon when the frame is in printing position, the outer face of said window being uppermost when the frame is in loading position; an elastic blanket operatively associated with each window to press work into firm contact with the window; a light source within the shell which is adapted to provide light of substantially the same intensity to all said windows; and means for individually controlling the time which each window is illuminated by the light source.

13. In a device of the character described: a plurality of juxtaposed vertical printing compartments arranged at equal distances about a central vertical axis to form a polygonal enclosure, each said compartment having a rectangular exposure frame adjacent said axis and a printing frame the side margins of which are in a plane parallel to that of said exposure frame and said vertical axis and more distant from the latter; a solid transparent window in each printing frame which is a segment of a cylinder struck about said vertical axis; radially extending vertical walls separating adjacent printing compartments; means for supporting work in firm contact with the outer face of each window; a central light source adapted to illuminate all said windows substantially equally; a curtain type shutter wound on reels at the top and bottom of each exposure frame, each said shutter having an opening substantially the size of the printing frame and adapted to register with the exposure frame; reversible shutter drive means for moving the shutter curtain across said exposure frame in either direction; means for operating said drive means to move the shutter in opposite directions on successive exposures; and variable shutter drive control means operable on movement of the shutter in either direction for stopping each shutter for a predetermined length of time with the shutter opening aligned with the window.

14. In a device of the character described: a plurality of juxtaposed vertical printing compartments arranged at equal distances about a central vertical axis to form a polygonal enclosure, each said compartment having a rectangular exposure frame adjacent said axis and a printing frame the side margins of which are in a plane parallel to that of said exposure frame and said vertical axis and more distance from the latter, each printing frame having a solid transparent window; radially extending vertical walls separating adjacent printing compartments; means for supporting work in firm contact with the outer face of each window; a central light source adapted to illuminate all said windows substantially equally; a curtain type shutter wound on reels at the top and bottom of each exposure frame, each said shutter having an opening substantially the size of the printing frame and adapted to register with the exposure frame; shutter drive means for moving each shutter curtain across said exposure frame; and variable shutter drive control means for stopping each shutter with the shutter opening aligned with the window for a predetermined length of time within a time range.

References Cited in the file of this patent

UNITED STATES PATENTS

| | | |
|---|---|---|
| 607,648 | Schwarz | July 19, 1898 |
| 865,797 | Palmer | Sept. 10, 1907 |
| 996,529 | Sears et al. | June 27, 1911 |
| 1,503,507 | Koch | Aug. 5, 1924 |
| 1,675,493 | Huebner | July 3, 1928 |
| 1,871,484 | Uyttenbroeck | Aug. 16, 1932 |
| 2,699,102 | Doyle et al. | Jan. 11, 1955 |